United States Patent
Reed et al.

(10) Patent No.: US 8,172,652 B2
(45) Date of Patent: May 8, 2012

(54) METHOD AND APPARATUS FOR HARVESTING LIVERS AND HEARTS

(75) Inventors: Charley Reed, Tontitown, AR (US); Mark Griffin, Springdale, AR (US); Tim Reddell, Bentonville, AR (US); James Ruff, Farmington, AR (US); Ron Mackey, Springdale, AR (US); John E. Johnson, Jefferson, SD (US)

(73) Assignee: Tyson Foods, Inc., Springdale, AR (US)

( * ) Notice: Subject to any disclaimer, the term of this patent is extended or adjusted under 35 U.S.C. 154(b) by 1007 days.

(21) Appl. No.: 11/619,185

(22) Filed: Jan. 2, 2007

(65) Prior Publication Data

US 2008/0160892 A1   Jul. 3, 2008

(51) Int. Cl.
 *A22C 17/00*   (2006.01)
 *A22C 21/00*   (2006.01)
(52) U.S. Cl. .................. 452/112; 452/106; 452/113
(58) Field of Classification Search .................. 452/106, 452/111, 112, 113, 115, 149, 155, 156, 177
See application file for complete search history.

(56) References Cited

U.S. PATENT DOCUMENTS

| | | | |
|---|---|---|---|
| 3,902,221 A * | 9/1975 | Harben et al. | 452/118 |
| 4,073,040 A * | 2/1978 | Hill | 452/112 |
| 4,249,284 A * | 2/1981 | Graham et al. | 452/112 |
| 4,395,795 A * | 8/1983 | Hazenbroek | 452/112 |
| 4,590,643 A | 5/1986 | Hill | |
| 4,608,732 A * | 9/1986 | Hill et al. | 452/114 |
| 4,748,722 A * | 6/1988 | Risser et al. | 452/111 |
| 4,965,908 A | 10/1990 | Meyn | |
| 5,041,052 A | 8/1991 | Conner et al. | |
| 5,041,053 A * | 8/1991 | Ellis et al. | 452/106 |
| 5,098,335 A | 3/1992 | Ellis et al. | |
| 5,186,678 A * | 2/1993 | Conner et al. | 452/106 |
| 5,242,324 A * | 9/1993 | Koops | 452/111 |
| 6,638,155 B2 * | 10/2003 | Jensen et al. | 452/117 |
| 6,962,525 B2 * | 11/2005 | Tomcak et al. | 452/134 |
| 2006/0154587 A1 * | 7/2006 | Mikkelsen et al. | 452/150 |

OTHER PUBLICATIONS

Meyn; "Topic Giblet Harvester," User & Maintenance Manual: 2004090123; Cover Sheet and pp. 1 through 168; Meyn Food Processing Technology B.V., Noordeinde 68, 1511 AE Oostzaan, the Netherlands.

* cited by examiner

*Primary Examiner* — David Parsley
(74) *Attorney, Agent, or Firm* — Mark E. Stallion, Esq.; Husch Blackwell LLP

(57) ABSTRACT

A method and apparatus for harvesting livers and hearts from a giblet package comprising an infeed pinch roller assembly, a slide assembly, an indexer assembly, an intestine pull down and a liver and heart separator assembly, for harvesting livers and hearts with an increased yield. The steps of the process include loading a load viscera pack into a feed chute that channels the pack to a pair of counter rollers. The viscera pack is captured by infeed pinch rollers thereby forcing the package into and between the rollers with only the gizzard remaining on top of the roller body. The liver and heart is isolated and separated by a pull down stripper assembly and a stripper arm assembly.

21 Claims, 15 Drawing Sheets

METHOD AND APPARATUS FOR HARVESTING LIVERS AND HEARTS

BACKGROUND OF INVENTION

1. Field of Invention

This invention relates generally to poultry processing and, more particularly, to harvesting usable parts of a poultry vascular system from the viscera.

2. Background Art

Various usable parts of the vascular system are harvested from the viscera of a poultry carcass. Particularly the heart and the liver are harvested from the viscera pack or more specifically what is generally referred to as the giblet package. The giblet package comprises the gizzard, liver, lungs, heart, intestines and vent. The natural structure of the package comprises two different kind of connections between the organs contained in the viscera. There are functional connections comprising the esophagus to the pre-stomach, the pre-stomach to the gizzard, and the gizzard to the duodenum. The are also major membrane or fleece connections between the liver and gizzard, between the package and crop, and between the heart and liver. In the past, the separation of the usable parts such as the liver and heart from the package was performed by a manual operation. For example, an operator would sever the connection between the liver or gizzard and further remove the intestines and other unusable parts such as the lungs. However, the manual operation was manually intensive, inconsistent in quality and not cost effective. It became evident that a mechanical process was needed for harvesting the usable parts of the viscera.

Various mechanical methods have been developed to isolate the liver and heart for separation by capturing certain portions of the package and utilizing the natural and membrane connections to isolate and position other portions of the package such as for example the portion containing the liver and heart. For example, previous methods have been utilized, which include the steps of mechanically stretching the viscera connected to the liver to pull the gall bladder away from the liver and mechanically cutting between the liver and the gall bladder to separate the liver from the viscera and the gall bladder. Previous methods have also included the steps of mechanically stretching the connecting structure connecting the liver to the heart to pull the heart away from the liver and mechanically cutting the connecting structure between the liver and the heart to separate the liver from the heart. Some of these types of methods include conveying poultry along a prescribed conveying path with the viscera still attached to the poultry carcass while pulling the viscera away from the liver to stretch the viscera and pull the gall bladder away from the liver; and finally separating the liver from the viscera by cutting the stretched connecting structure between the liver and the gall bladder.

This type of apparatus can be designed for use with an overhead conveyor used to transport poultry through the eviscerating section of the poultry plant with the carcass head hanging downward. A locating conveyor moving synchronously with the overhead conveyor has been utilized, where a liver positioning guide is utilized for pulling the viscera away from the liver so that the connecting structure between the gall bladder and the liver is stretched to pull the gall bladder away from the liver for separation. A heart positioning guide can be utilized, which engages the connection between the heart and the liver to selectively position the heart. A heart cutoff mechanism can be utilized to cut the heart from the liver, and a liver cutoff mechanism to cut between the liver and the gall bladder to separate the liver from the rest of the viscera. However, a system of this nature provides a poor yield, and often damages the livers.

Various methods and apparatus have been utilized to separate and isolate the usable parts including roller devices and guide devices to stretch and extend the functional and membrane connections for isolating and separating the usable parts. However, previous methods and apparatus have resulted in a poor yield and inconsistent quality. Further many systems require excessive maintenance and include expensive specially designed parts and mechanisms. A better system is needed considering the market demand for livers has steadily increased. In the past the amount of labor required was directly related to the ability to produce a quality product for customers. The fully automatic liver harvester systems that have been utilized do not address this issue and do not produce a consistent yield, and the maintenance and upkeep for the equipment can be very intensive.

By developing a simple system that consistently produces a higher yield percentage of the total available livers, a manufacture can decrease their cost and labor associated with the fully automatic system and standardize the liver harvesting system to consistently produce a higher quality product. Therefore, the problems of significant damage to the livers, use excessive amounts of water, and specialized parts and added labor, can be resolved.

BRIEF SUMMARY OF INVENTION

The invention is a method and apparatus for harvesting livers and hearts from a giblet package comprising an infeed pinch roller assembly, a slide assembly, an indexer assembly, an intestine pull down and a liver and heart separator assembly, which teaches a novel method and apparatus for harvesting livers and hearts with an increased yield. The steps of the process can include loading a viscera pack into a feed chute of an infeed assembly that channels the pack such that it falls into a pair of counter rollers turning into themselves in motion, and spaced proximately apart, such as for example about approximately 0.5" apart+/−0.1". The viscera pack can be captured by the infeed counter or infeed pinch rollers thereby forcing the package into and between the rollers with only the gizzard remaining on top of the roller body.

An over head indexer conveyor assembly including and an endless over head indexing feed chain or endless indexing feed belt having extending there from indexers, which engages the gizzard and pushes the viscera pack and pushes the gizzard with viscera through the length of the pinch rollers and down a set of slide rails with the gizzard sliding along the top side of the slide rails. A first module that the viscera is contacted with is a pull down bar or a pull down plate or member which pulls the pack in the area of the liver in a downwards motion away from the slide rail and gizzard retained on top of the slide rail. The result is the pack membranes can be loosened and positioned in line for the next module. After moving the pack further along the slide rail proximately from the first module, for example about approximately 1 foot+/−0.1", a second module pulls the intestine downward away from the slide rail and gizzard and pulls the intestine away from the liver. This can be accomplished by utilizing an endless pull down belt having flaps extending there from. A spinning blade can also be used remove any excess intestine from the lower liver as the pack continues on to the next module.

The pack can continue onto the final strip down module or stripper arm assembly where the liver is directed by alternate guide rails into a flighted belt with stationary top with an opening, for example about approximately 0.25 inch+/−0.05 inch to allow the upper intestine to travel as it remains attached to the gizzard retained in the upper guide rail. The liver can then be powered through a decline, for example about approximately 10-35 degrees where the remaining upper intestine is pulled through the upper opening allowing the lungs spleen and bile sack to be pulled away from the liver through the opening slot or strip down gap. At the end of the module a rotary cutting blade can be utilized to separate the liver and heart from the remaining viscera pack. The heart and liver can now be removed to an inspector belt for grading.

An alternative embodiment can include proximately spaced apart counter rollers each having an endless belt traveling over said rollers whereby the belts convey inward one toward the other and can be sloped inward with respect to each other to converge at the nip line between the rollers. The belts can be sloped inward to properly position the viscera and direct the bottom portion toward the hip line. In this alternative embodiment, the belt and rollers can create an infeed belt assembly combination that can be utilized in lieu of the infeed pinch rollers.

The present invention increases the yield and quality significantly. These and other advantageous features of the present invention will be in part apparent and in part pointed out herein below.

BRIEF DESCRIPTION OF THE DRAWINGS

For a better understanding of the present invention, reference may be made to the accompanying drawings in which.

DETAILED DESCRIPTION OF INVENTION

Figure 1:
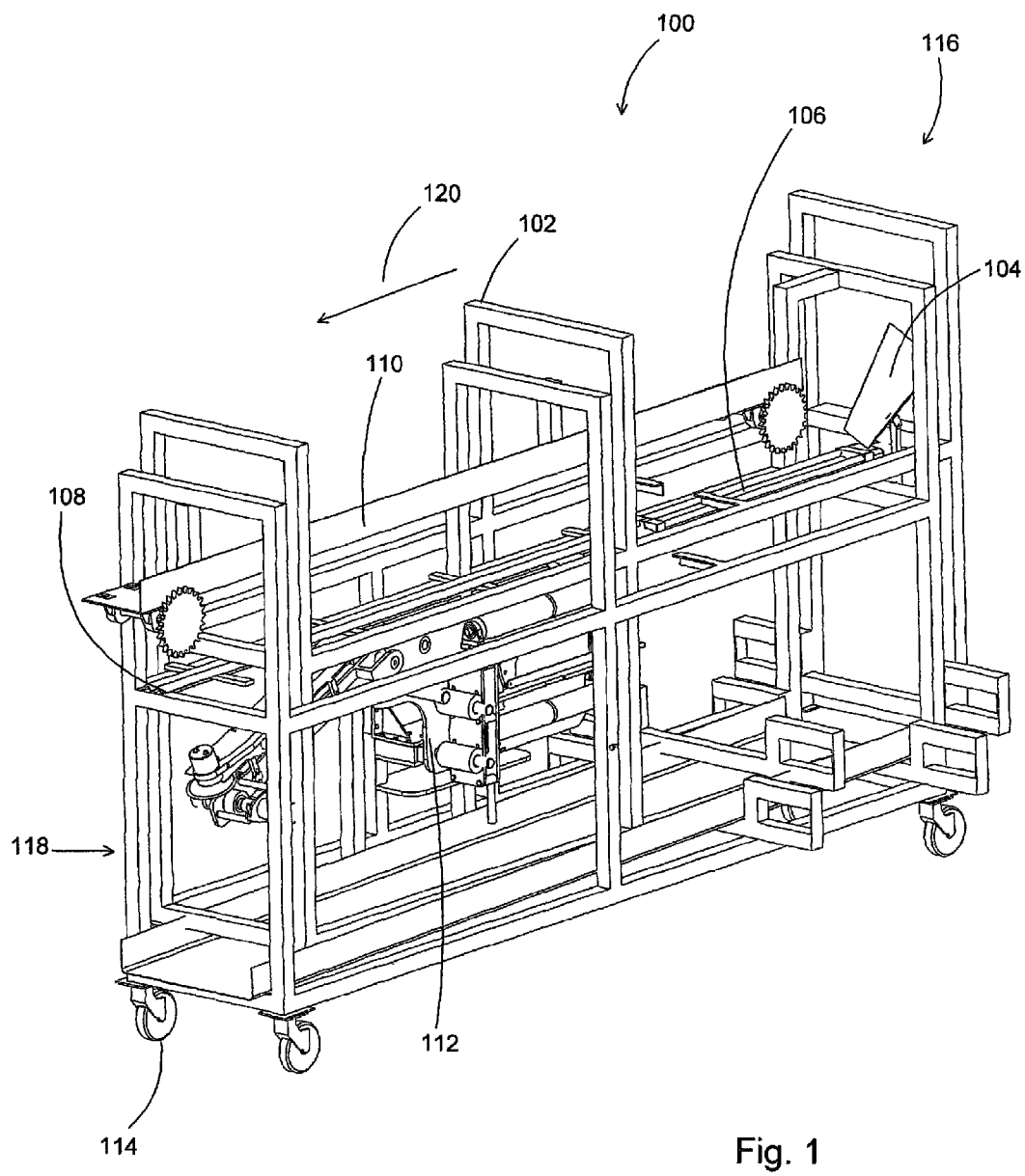
FIG. 1 is a front left side perspective view of a liver and heart harvester assembly.

According to the embodiment(s) of the present invention, various views are illustrated in FIG. 1-13 and like reference numerals are being used consistently throughout to refer to like and corresponding parts of the invention for all of the various views and figures of the drawing. Also, please note that the first digit(s) of the reference number for a given item or part of the invention should correspond to the FIG. number in which the item or part is first identified.

One embodiment of the present invention comprising an infeed pinch roller assembly, a slide rail assembly, an overhead indexer conveyor assembly, an intestine pull down and a liver and heart stripper arm assembly teaches a novel apparatus and method for harvesting livers and hearts.

The details of the invention and various embodiments can be better understood by referring to the figures of the drawing. Referring to FIG. 1, a front left side perspective view of a liver and heart harvester assembly 100 is shown. The liver and heart harvester assembly 100 can be readily inserted in a poultry processing line for processing a viscera pack to remove usable parts such as for example the heart and liver. The liver and heart harvester assembly 100 is shown having a upstream entry end 116 and a downstream exit end 118. The viscera pack can be transversed along a path from the entry end 116 to the exit end 118 as indicated by arrow 120 showing the path of conveyance. Prior to being received by the liver and heart assembly 100, the viscera pack can be removed from the poultry carcass. Once removed, the viscera pack can be allowed to fall into the infeed assembly 104 having an infeed chute for channeling the viscera pack into the harvester system for further processing. The infeed assembly 104 can channel the viscera pack to engage the infeed pinch counter roller assembly 106. Also see the alternative embodiment as described in FIGS. 12 and 13 where the infeed pinch roller is replaced with an infeed belt assembly. The viscera pack is channeled to engage a pair of counter rollers turning into themselves in motion and spaced apart such that the viscera pack is forced into the rollers with only the gizzard portion of the viscera pack remaining on top of the roller body. The counter rollers can be sufficiently aggressive to pull all of the viscera pack therethrough with the exception of the gizzard portion. An overhead indexer conveyor assembly 110 can engage the viscera pack by engaging and pushing the gizzard portion along the length of the rollers to thereby exit the roller assembly 106 to engage a slide assembly 108.

The slide rail assembly 108 can have proximately spaced apart left and right v-shaped slide rails where the viscera pack can engage the slide rails by positioning the gizzard portion of the viscera pack to ride on top of the left and right slide rails and the remainder of the viscera pack hanging below the slide rails. The connection between the gizzard and the remainder of the viscera pack can be captured between the two v-shaped slide rails and the indexer assembly can continue to advance the viscera pack along the slide rails.

As the viscera pack is being advanced along the slide rails, the portion of the viscera pack containing the heart and the liver positioned below the slide rails can be engaged by a pull down back plate or a pull down bar or member which pulls or urges the pack downward by engaging the viscera in the liver area causing a downward motion downward away from the slide assembly and the gizzard portion. This step can be performed such that the pack membranes can be loosened and positioned in line for the next processing step. The overhead indexer assembly can further advance the viscera pack by engaging the gizzard portion to thereby engage the liver at heart stripper assembly 112 such that the heart and the liver portions of the viscera pack can be removed. A cutting device can be utilized to server the gizzard portion just prior the product exiting the harvest assembly at the exit end 118.

Figure 2:
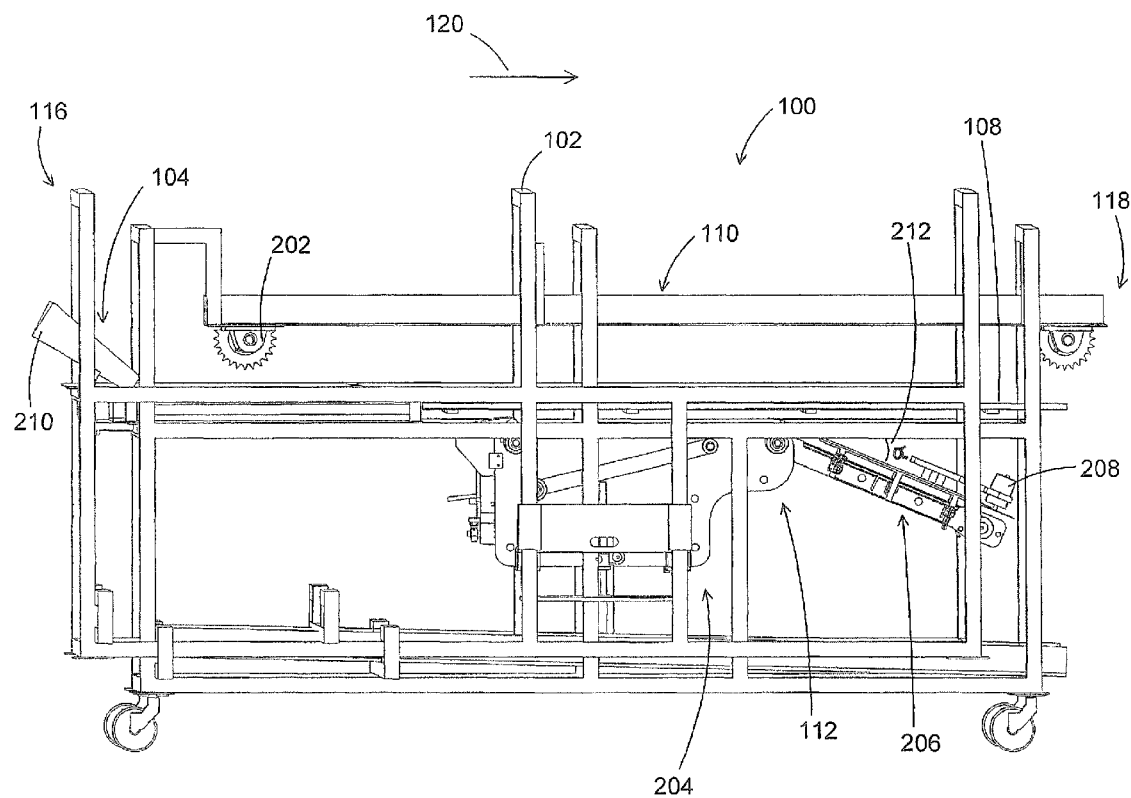
FIG. 2 is a right side view of a liver and heart harvester assembly.

Referring to FIG. 2, a right side view of a liver and heart harvester assembly 100 is shown. The side view provides a more clear illustration of the path of conveyance 120 of the product as it travels from the entry end 116 to the exit end 118.

The overhead indexer assembly 110 advances the product along the path of conveyance 120. The indexer assembly as shown in this side view is shown without the indexing belt 302 having indexers 304, which is discussed below. The indexer assembly 110 utilizes an indexing belt or chain to index the product and also advance the product along the path of conveyance 120. The indexing belt or indexing chain can be an endless belt or chain that is advanced by sprockets 202. The sprockets 202 can power the belt to advance the product along the path of conveyance for each step of the process.

This side view also shows the infeed assembly 104 having a chute 210 having a downward angle for channeling the product to engage the infeed pinch counter roller assembly. When the product engages the counter rollers as discussed above, the gizzard portion of the viscera remains on top of the rollers while the remainder of the viscera pack is below the rollers. The indexer assembly 110 utilizing the endless indexing belt engages the gizzard portion of the product to advance it through the rollers and then engage the slide assembly for directing the product along a path of conveyance to engage the pull down stripper assembly 204 and the strip down arm assembly 206 or stripper arm assembly and finally engage the cutter 208.

Prior to engaging the pull down stripper assembly 204, the product can engage a pull down back plate or pull down member which pulls the pack in the liver area in a downwards motion away from the slide rail assembly to thereby loosen the membranes of the viscera pack. The overhead indexer assembly 110 pushes the viscera pack along the slide rail assembly to engage the pull down stripper assembly which pulls the intestine downward and away from the slide rail and gizzard and pulls the intestine away from the liver. A blade or pull down cutter (not shown), such as for example, a motorized circular blade, can also be utilized at this stage to remove the excess intestine from the lower liver as the pack continues along the path of conveyance to the stripper arm assembly 206.

The indexer assembly 100 can further advance the pack to engage the stripper arm assembly 206 by engaging a strip down plate assembly where the remaining upper intestine is pulled through a length-wise gap allowing the lungs, spleen and bowel sack to be pulled away from the liver through the gap as the product is advanced along a downward decline along the stripper arm assembly. A cutter 208 can be utilized to separate the liver and heart from the remaining viscera pack. The heart and liver can now be removed for inspection and grading. The downward decline of the stripper arm assembly 206 can have a downward angle 212 that is about approximately 15 to 35 degrees in decline. The decline is effective to pull the lungs, spleen and bowel pack away from the liver by pulling it through the gap of the stripper arm assembly 206.

Figure 3:
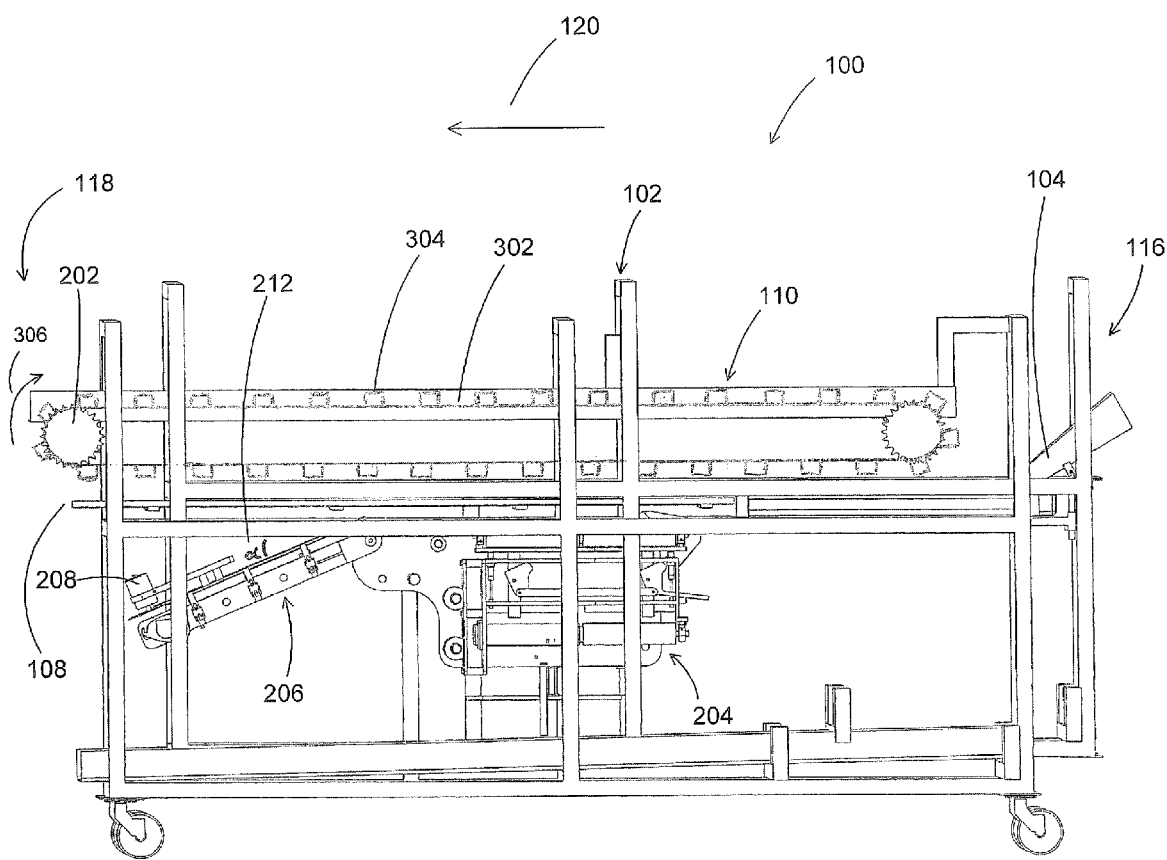
FIG. 3 is a left side view of a liver and heart harvester assembly.

Referring to FIG. 3, a left side view of a liver and heart harvester assembly is shown. This view shows the opposing side of the liver and heart harvester assembly. This view also shows several of the primary components comprising the infeed assembly 104, the overhead indexer conveyor assembly 110, the pull down stripper assembly 204 and the stripper arm assembly 206. This illustration also provides an illustration of the indexer assembly 110 having an endless indexing belt 302 further comprising indexers 304 or indexer members. The indexing belt 302 can be powered by sprockets 202 by rotating in a direction as indicated by arrow 306. The indexing belt 302 can have evenly spaced apart indexers 304, which are utilized to engage and capture the gizzard portion of the viscera pack to advance the viscera pack along the path of conveyance as indicated by arrow 120.

The indexing belt 302 can be operable to adjust its speed such that the time of the belt is synchronized with the rate of the input of the viscera packs. The indexers 304 can index and advance the viscera pack along the path of conveyance to be processed by the infeed pinch counter roller assembly 106, the pull down stripper assembly 204, and the stripper arm assembly 206. As the viscera pack is advanced along the slide rail assembly 108 along the down stream portion of the slide rail assembly above the stripper arm assembly, the gizzard portion of the viscera pack can remain above the slide assembly while the liver section of the viscera pack is pulled downward along the stripper arm assembly 206 at an angle 212 with respect to horizontal such that the remaining upper intestine is pulled upward allowing the lungs and spleen and bowel pack to be pulled away from the liver through the stripping gap in the stripper arm assembly. At the end of the stripper arm assembly the cutter 208 can separate the liver and heart from the remaining viscera pack where the heart and liver can now be removed for inspection.

Figure 4:
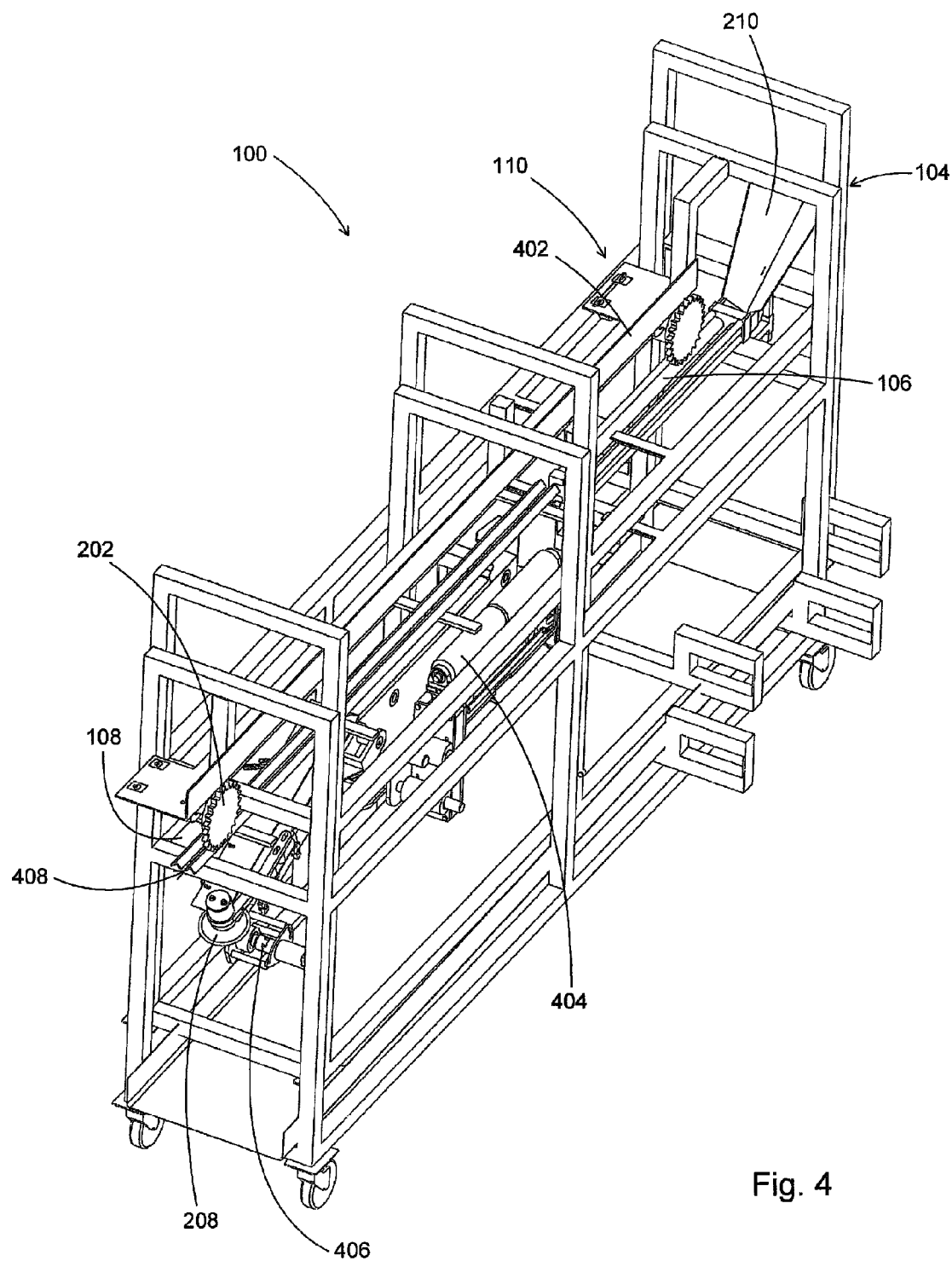
FIG. 4 is a front top left side view of a liver and heart harvester assembly.

Referring to FIG. 4, a front top left side view of a liver and heart harvester assembly is shown. This view of the liver and heart harvester assembly 100 provides a better view of the infeed pinch counter roller assembly 106 and the slide assembly 108. The chute 210 of the infeed assembly 104 is shown with an orientation to channel the viscera product directly into the counter roller assembly 106. See the alternative embodiment described in FIGS. 12 and 13, which replaces the pinch roller. The counter roller assembly is shown below the overhead indexer assembly 110 having an indexer support bracket 402 for attaching the indexer assembly 110 to the frame at a position above the other components. The slide assembly 108 is shown in a downstream position along the path of conveyance with respect to the roller assembly 106. The slide assembly is shown comprising side by side v-shaped slide rails proximately spaced apart having a slide gap 408 there between.

The connective tissue of the viscera pack between the gizzard and the remaining portion of the viscera pack is allowed to travel along the gap in the slide assembly 108 as the gizzard of the viscera pack remains above and rides on top of the slide rail assembly while the remainder of the viscera pack is below the slide assembly. The indexer conveyor assembly advances the viscera pack from the roller assembly 106 to engage and travel on the slide assembly 108. The slide assembly 108 is designed to capture and retain the gizzard portion of the viscera pack while allowing the remainder of the viscera pack to hang below to thereby engage the pull down stripper assembly and the stripper arm assembly.

After the product engages the strip down plate assembly, the product is engaged by the portion of the pull down stripper assembly 204 having pull down rollers 404. The pull down rollers 404 can have a belt traveling thereon where said belt can have flap members extending there from to pull downward on the viscera pack to further separate the intestines. This view also reveals the strip bearing 406 of the stripper arm assembly 206, which is the bearing on which the strip down rollers are attached.

Figure 5:
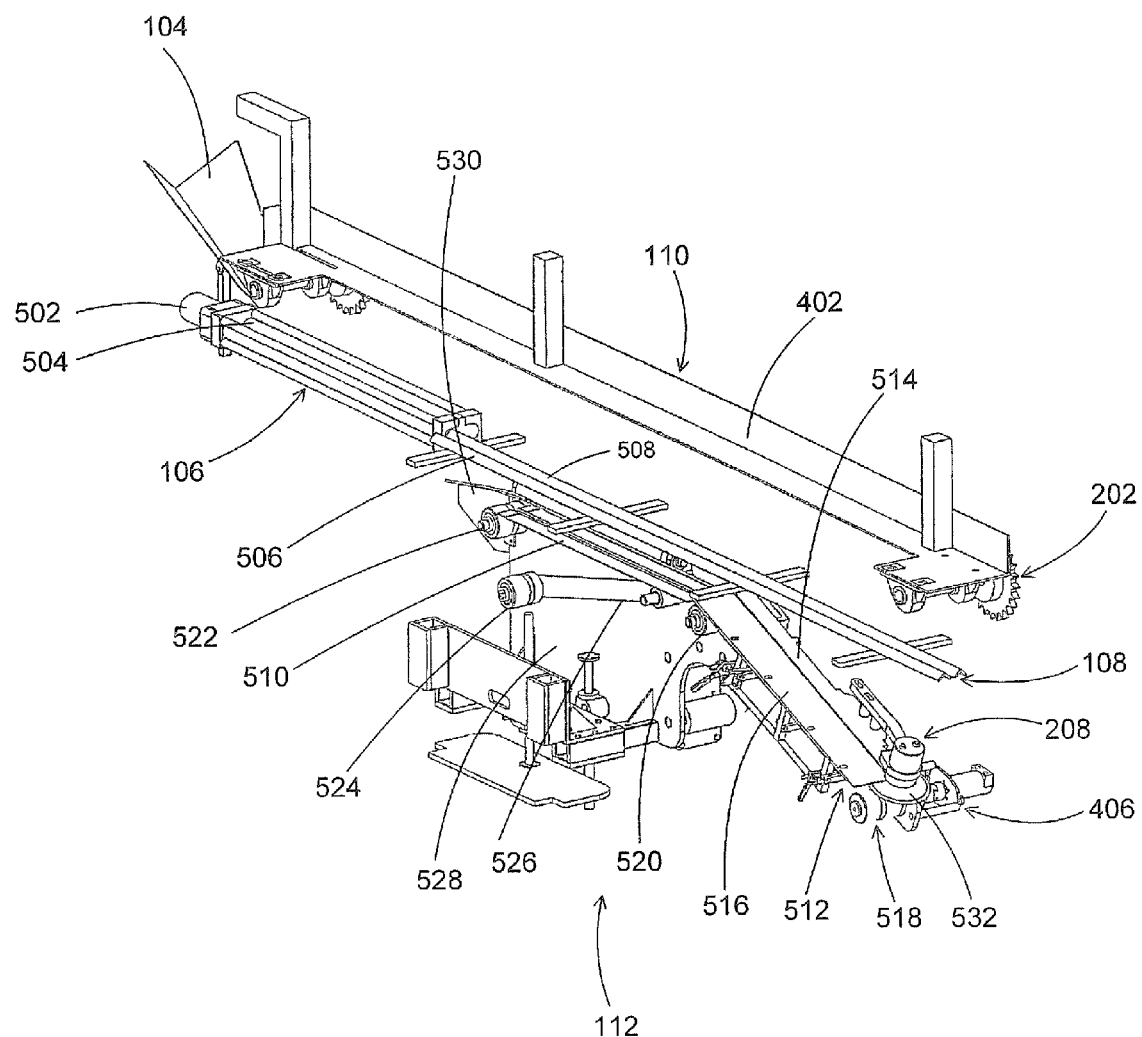
FIG. 5 is a front right side view of a liver and heart stripper assembly.
Figure 5A:
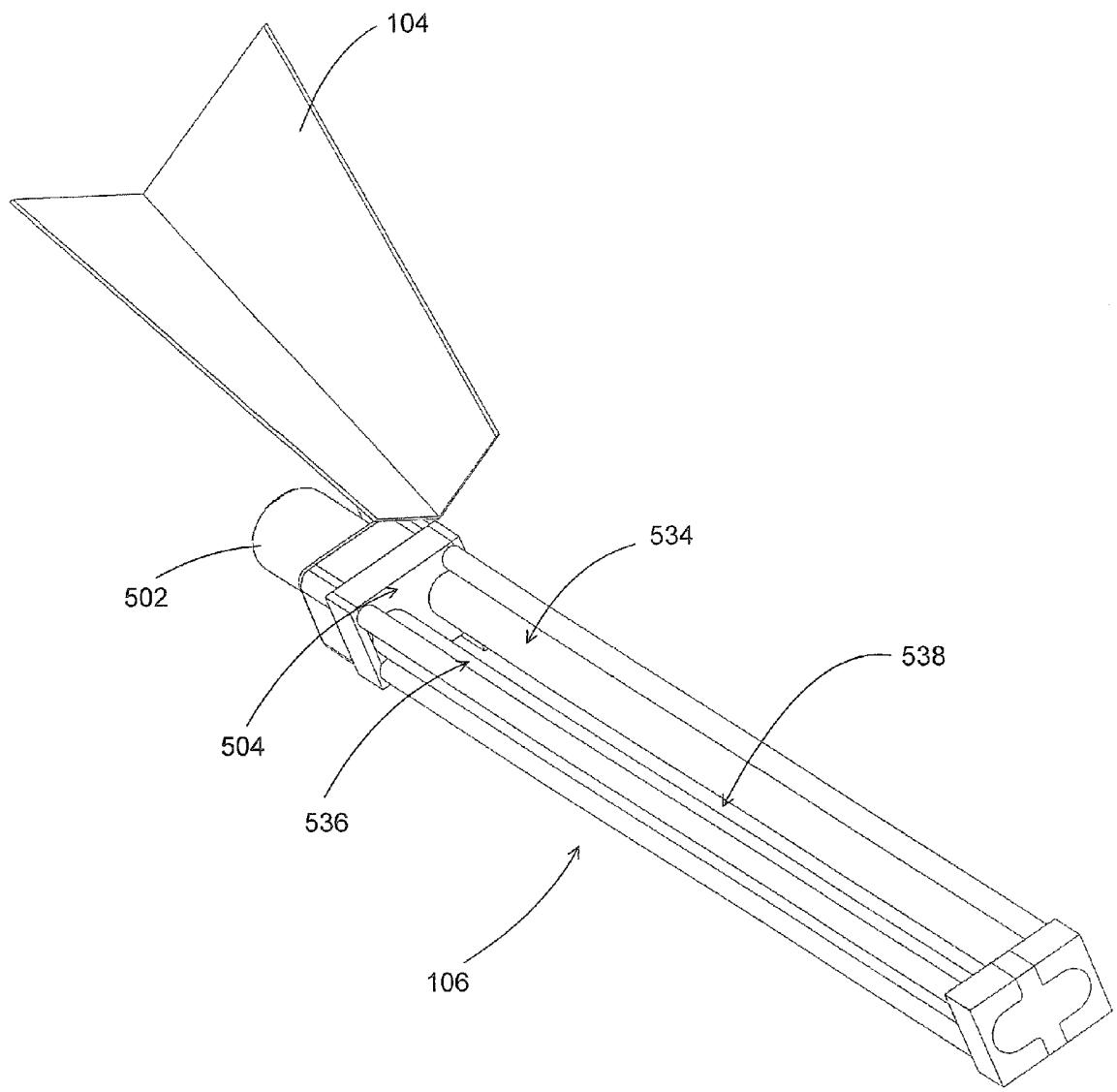
FIG. 5A is a perspective view of an infeed pinch roller assembly and an infeed assembly.

Referring to FIGS. 5 and 5A, a front right side view of a liver and heart stripper assembly is shown 112. This view shows the indexer assembly 110 disposed above the roller assembly 106, the slide assembly 108 where said slide assembly is disposed above the liver and heart stripper assembly 112. Again, the product is channeled by the infeed assembly 104 to engage the pinch rollers 504 of the roller assembly 106. The pinch rollers can be powered by a pinch roller motor 502. Again, the pinch rollers can be sufficiently aggressive to pull the viscera pack there through with the exception of the gizzard portion of the viscera pack. The indexer assembly can advance the pack to engage the slide assembly 108 which is shown having a right v-shaped slide rails 506 and a left v-shaped slide rail 508.

The pinch roller 504 includes left and right pinch rollers 534 and 536 respectively. The left and right rollers converge along a nip line 538. The space between the rollers 534 and 536 is sufficient to allow a portion of the viscera to pass there through.

The v-shaped slide rails are elongated slide rails having a v-shaped cross section. The vertex of the cross section of each bar is shown pointing upward thereby creating a valley between the slide rails 506 and 508. It is in this valley that the gizzard portion of the viscera pack can rest and be retained as it is being urged along the top surface of the slide rails. The left and right v-shaped rails are approximately spaced apart to allow passing through of the tissue connecting the gizzard of the viscera pack with the remaining portion of the viscera pack. Upon engaging and traveling on the upstream portion of the slide rail assembly 108, the viscera pack is engaged by a pull down back plate 530 which is designed to engage and pull downward on the viscera pack to further extend and loosen the membranes of the viscera pack. The pull down back plate can be a pull down bar or other member shaped to urge the liver area of the viscera downward when engaged.

This view also shows belt pan 510, roller 522, roller 524 and hold down arm 526. Rollers 522 and 524 and hold down arm 526 are for conveying and applying tension to the strip down belt conveyance. The pull down stripper assembly is shown having a back plate 528 for supporting the various members and for channeling the pack. As the viscera pack is advanced along the slide assembly 108, the viscera pack is engaged by the pull down stripper assembly 204 and is further advanced to the downstream end to engage the downward sloped stripper arm assembly 206 having a strip down plate assembly 512 further comprising a left strip down plate 514 and a right strip down plate 516. The strip down plates 514 and 516 are proximately spaced apart having a stripping gap there between along which connective tissue can travel and be pulled there through.

The downward angle of the stripper arm assembly 206 and more specifically the downward angle of the strip down plate 512 pulls downward on the viscera pack while the gizzard portion of the viscera pack remains above and travels along the topside of the slide rail assembly 108. The stripping gap between the strip down plates 512 and 514 is sufficiently wide to allow certain portions of the viscera pack to be pulled there through while sufficiently narrow to maintain the liver and heart portions of the viscera pack below the strip down plate assembly 512.

At the end of the strip down plate assembly 512 there can be a strip down cutter 208 having a blade 532 for severing the heart and liver portions from the portions of the viscera pack that were pulled upward through the gap between the left and right strip down plates. To further assist in this separation, the stripper arm assembly 206 can also include forward and rear strip down rollers 518 and 520. The strip down rollers can have an endless belt traveling thereon where said endless belt can have indexed strip down flaps for further assisting the pulling away of the liver and heart portions of the viscera pack and further indexing the various viscera packs being processed.

Figure 6:
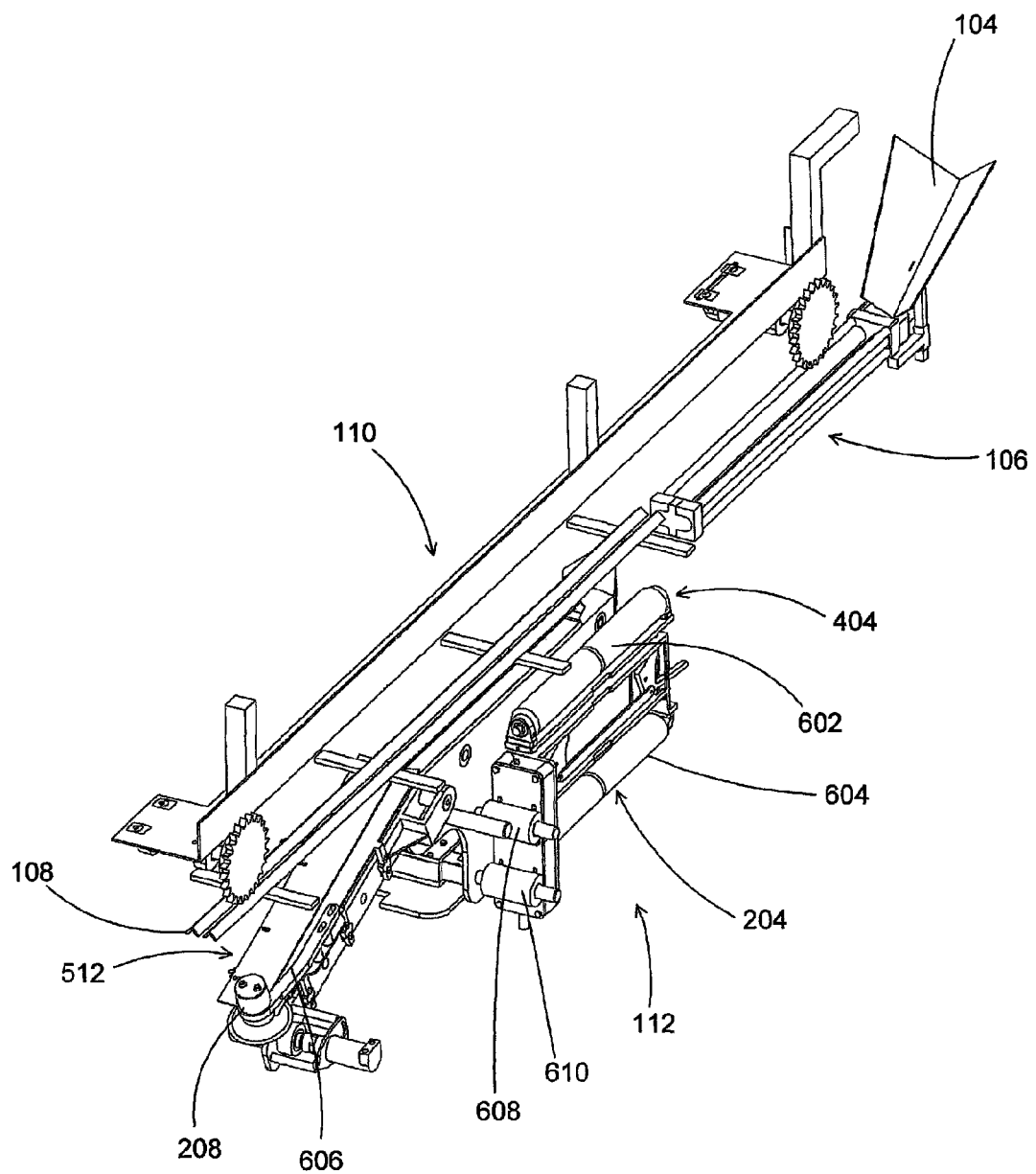
FIG. 6 is a front left side view of a liver and heart stripper assembly.

Referring to FIG. 6, a front left side view of a liver and heart stripper assembly is shown. This view provides an alternative view of the same assembly thereby providing a better view of the pull down stripper assembly functionality. This view of the liver and heart stripper assembly 112 again is shown disposed below the indexer assembly 110. The pull down assembly 204 is shown having pull down rollers 404 which comprises an upper pull down idle roller 602 and a lower pull down drive roller 604. The idle and drive functions of the respective rollers can reverse functionality without departing from the scope of the invention. The upper and lower pull down roller 602 and 604 can have traveling thereon an endless belt having indexed flaps for pulling downward on the viscera pack to further separation. This view also reviews a motor arm mount for mounting a cutter 208 with respect to the strip down plate assembly 512. The motor arm mount 606 can be adjustable to adjust the position of the cutter 208.

Figure 7:
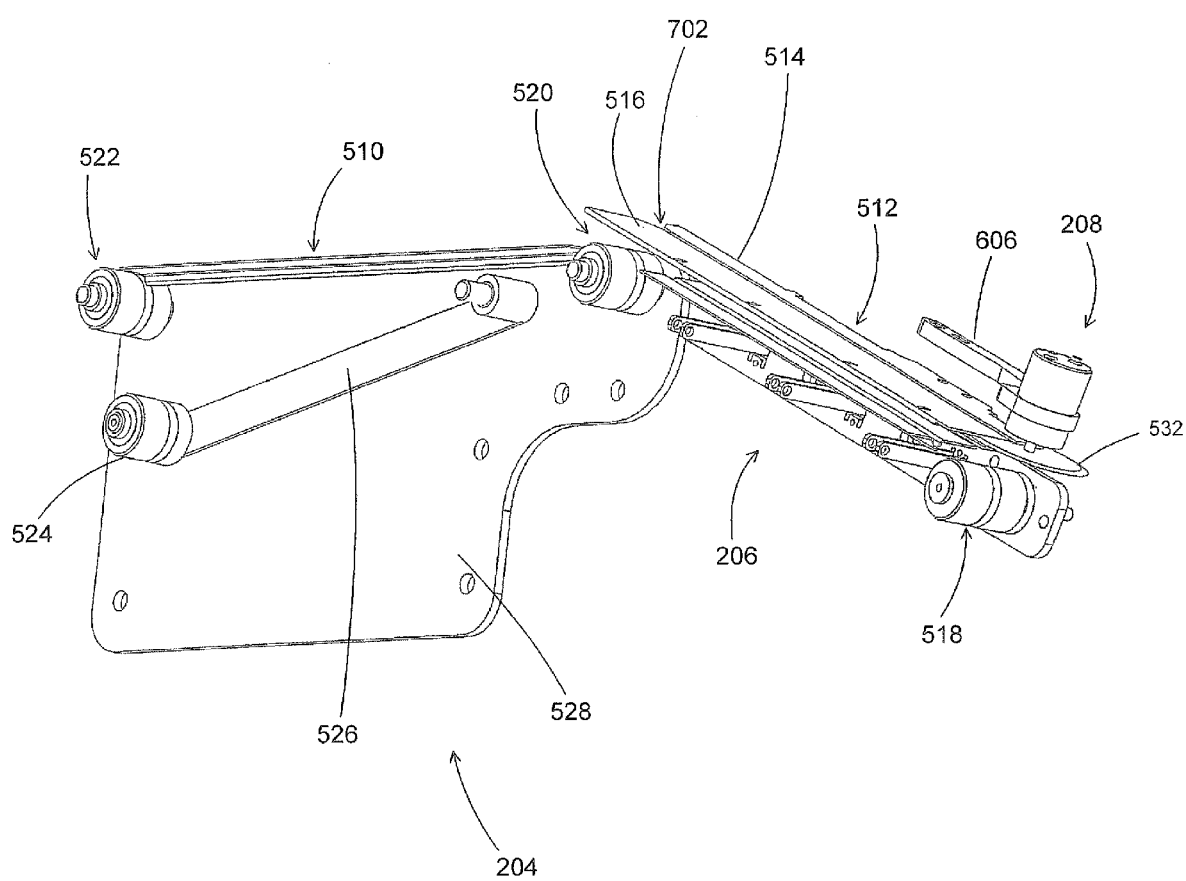
FIG. 7 is a front right side perspective view of a pull down stripper assembly and a stripper arm assembly.

Referring to FIG. 7, a front right side perspective view of a pull down stripper assembly and a stripper arm assembly is shown. This view provides further clarity relating to the position of the stripper arm assembly 206 with respect to the pull down stripper assembly 204. The stripper arm assembly 206 is shown with a downward decline for separation of the heart and liver portions of the viscera pack. This view also provides a further illustration of the roller 522, a tension roller 524, a hold down tension arm 526 and a belt pan 510. The tension roller and tension arm can be utilized to increase and decrease tension in the belt. Roller 522 is a further roller over which the strip down belt travels as reflected in FIGS. 8, 12 and 13. A further view of the strip down rollers 520 and 518 is also shown. This view also provides further clarity of the stripping gap 702 between the right and left strip down plates 514 and 516 of the strip down plate assembly 512.

Figure 8:
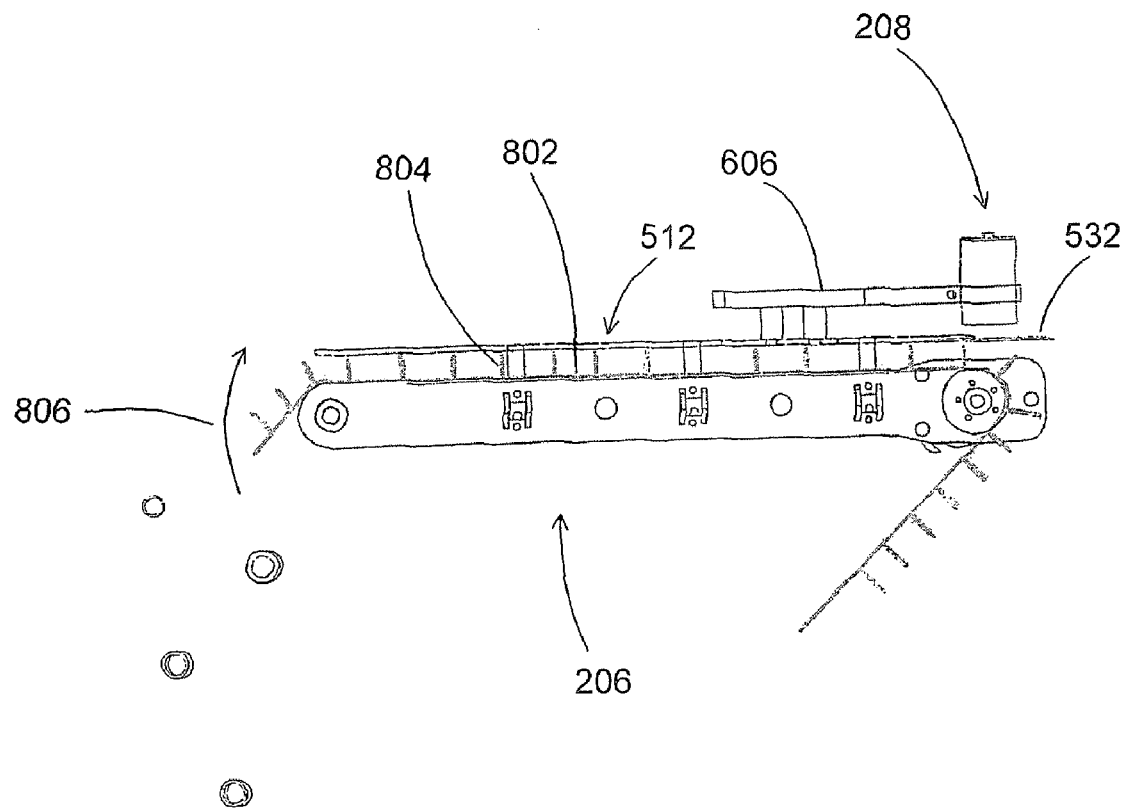
FIG. 8 is a cross section of a stripper arm assembly showing a strip down belt and indexers.

Referring to FIG. 8, a cross section of a stripper arm assembly showing a strip down belt and indexers is shown. This cross section the stripper arm assembly 206 provides an illustration of the relationship between the strip down plate assembly 512 and the cutter 208 including blade 532. This cross section view also provides an illustration of the strip down belt 802 having strip down indexers 804 which further facilitates the separation of the liver and heart from the remainder of the viscera pack. The forward and rear strip down rollers 518 and 520 can have the strip down belt traveling thereon such that the strip down belt is powered in a direction as indicated by arrow 806. The strip down indexers 804 can index the hearts and livers of the viscera packs as well as assist in pulling the heart and liver away from the remainder of the viscera pack.

Figure 9:
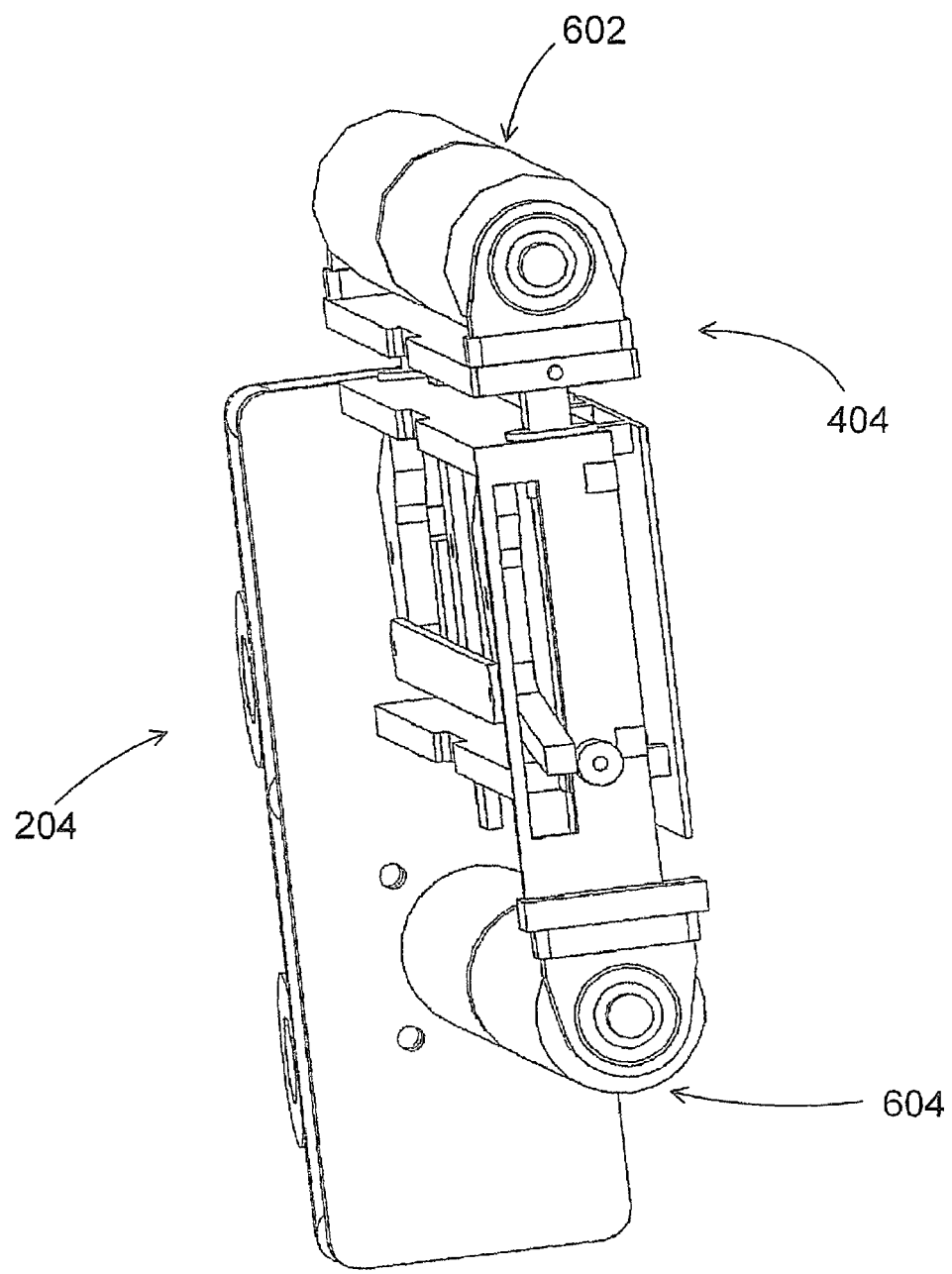
FIG. 9 is a side perspective view of a pull down stripper assembly.

Referring to FIG. 9, a side perspective view of a pull down stripper assembly is shown. This figure provides a view of the pull down rollers 404 comprising the upper pull down idle roller 602 and the lower pull down roller 604. This view of the pull down roller assembly 204 further illustrates its functionality.

Figure 10:
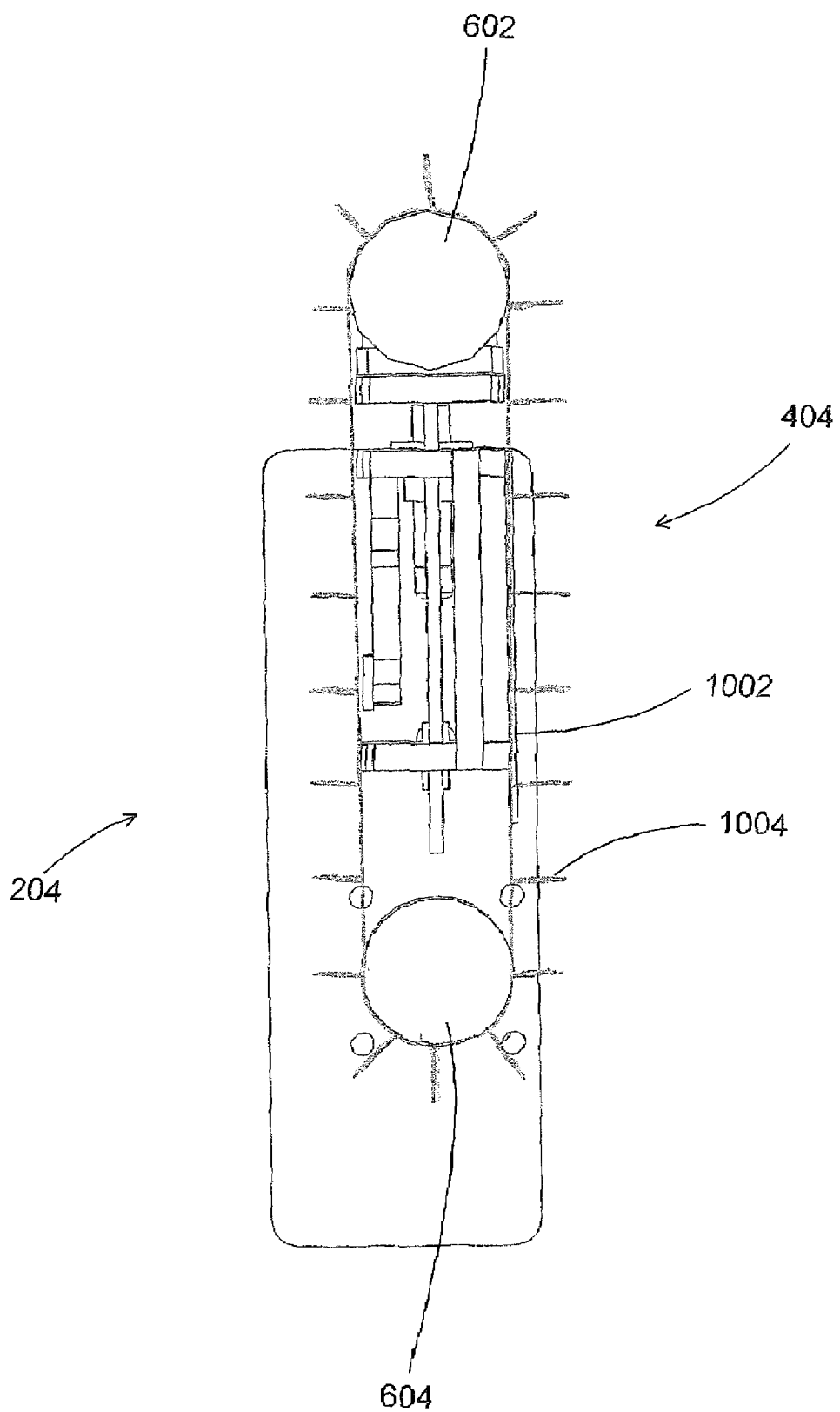
FIG. 10 is a cross section of a pull down stripper assembly showing a pull down belt and indexers.

Referring to FIG. 10, a cross section of a pull down stripper assembly showing a pull down belt and indexers is shown. This cross section view of the pull down stripper assembly 204 includes an illustration of a pull down belt 1002 comprising a plurality of pull down belt indexed flaps 1004 where the pull down belt travels about the pull down rollers comprising the upper pull down idle roller 602 and the lower pull down drive roller 604. The indexed flaps 1004 can assist in pulling downward on the viscera pack.

Figure 11:
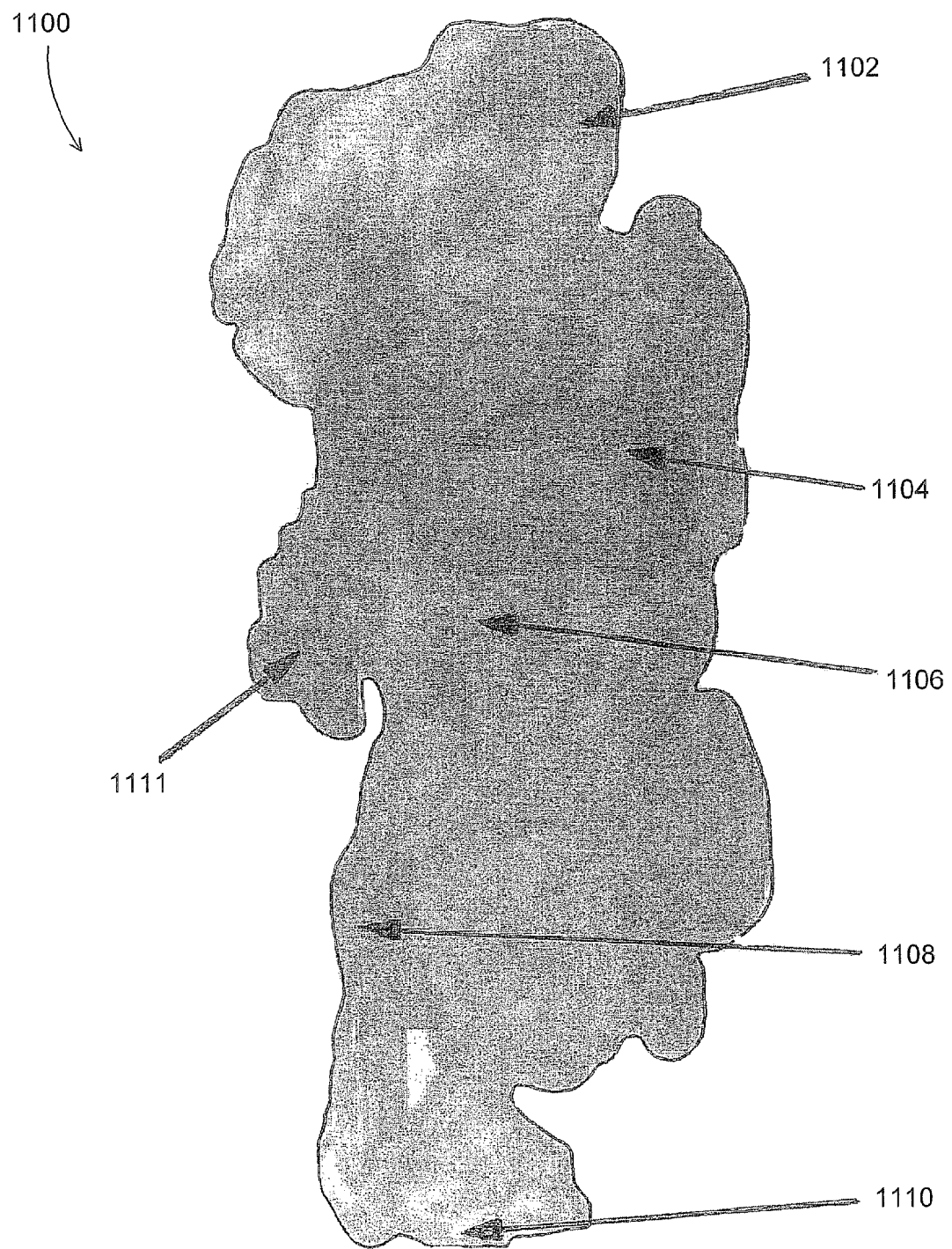
FIG. 11 is an illustration of a giblet package.

Referring to FIG. 11, what can be referred to as a giblet package 1100 is shown comprising a gizzard 1102, a liver and gall 1104, heart 1106, intestines 1108, vent 1110 and lungs 1111.

Figure 12:
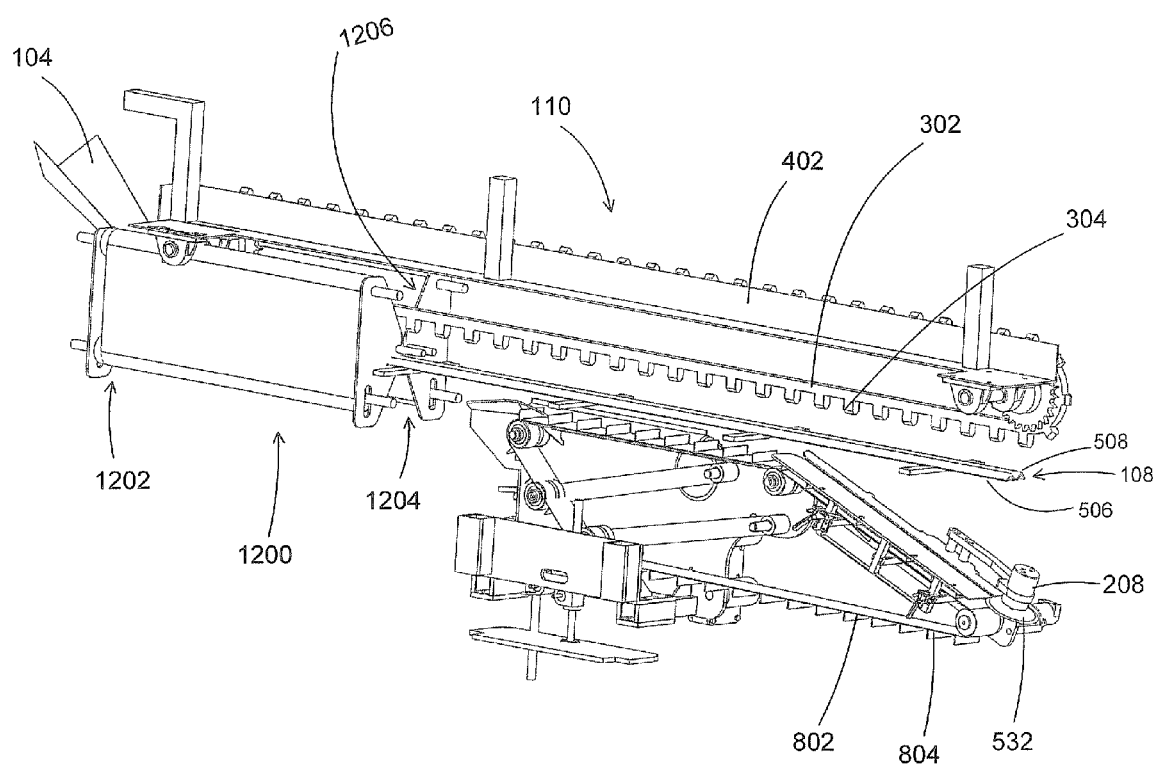
FIG. 12 is a perspective view of an alternative embodiment liver and heart stripper assembly.
Figure 13:
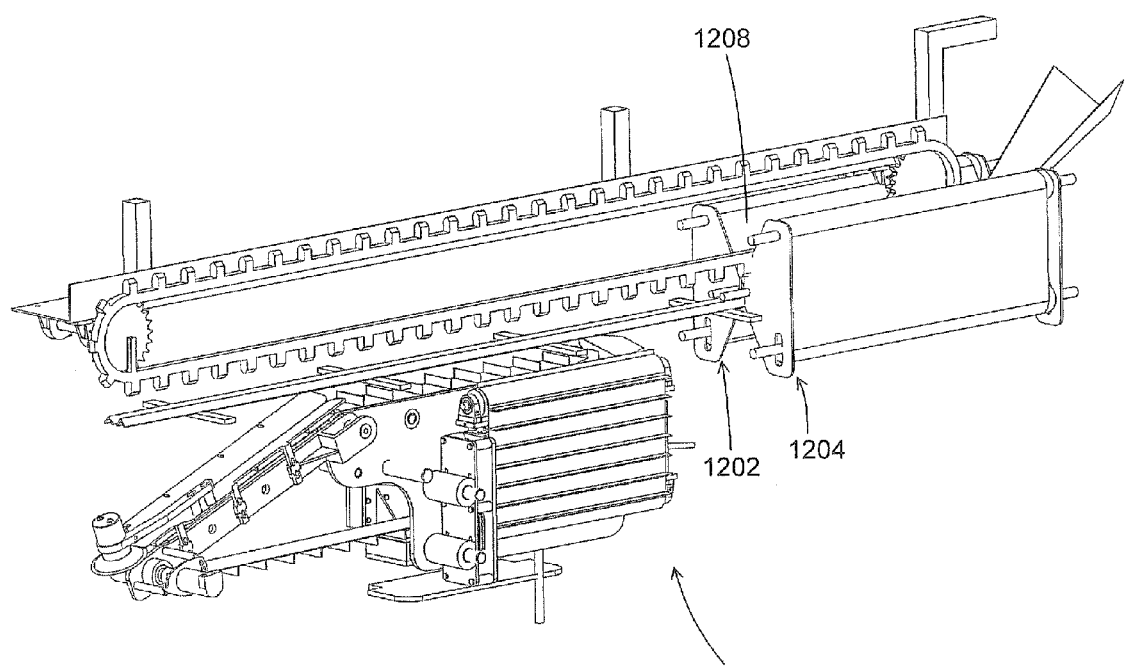
FIG. 13, is a perspective view of an alternative embodiment liver and heart stripper assembly.
Figure 13A:
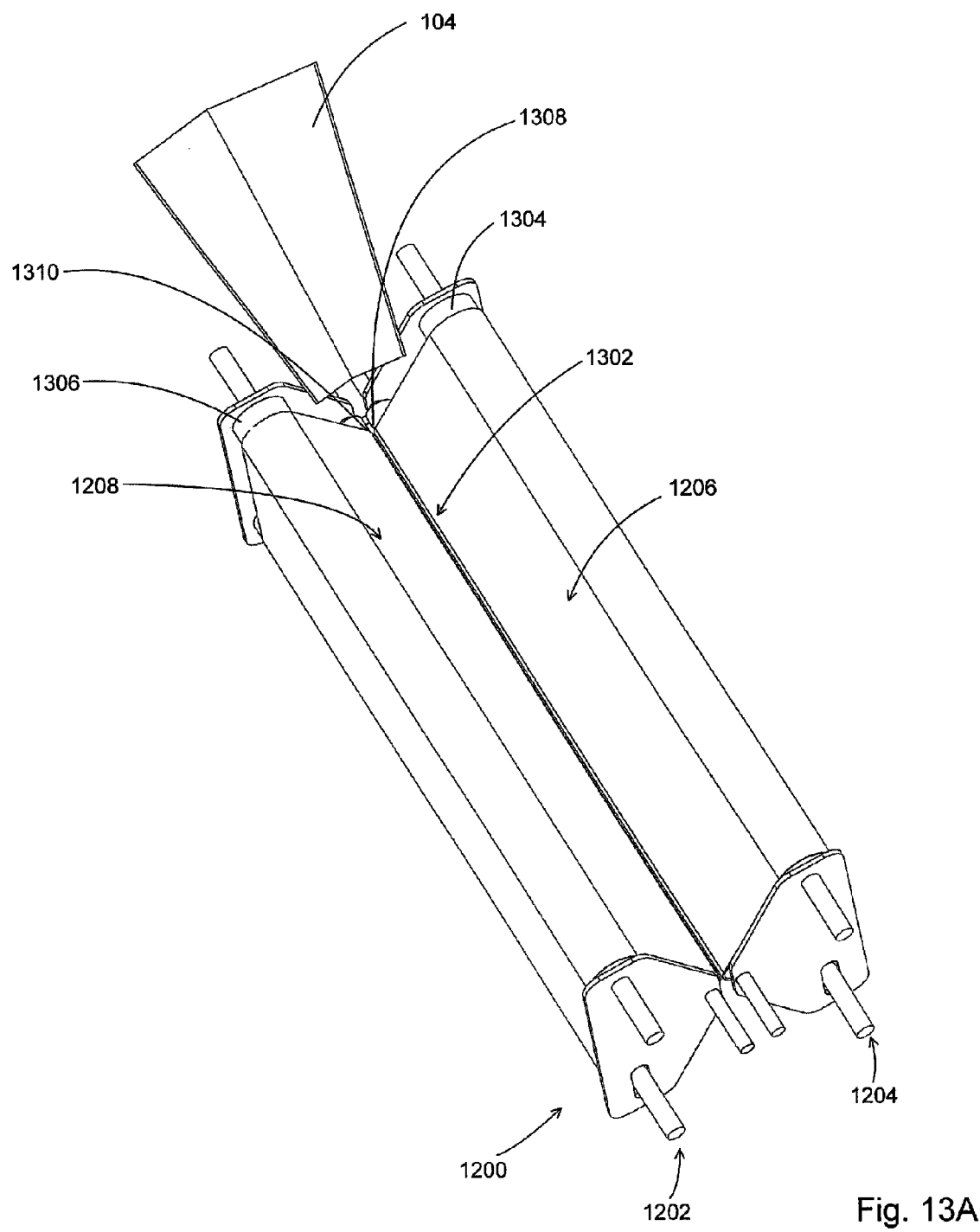
FIG. 13A is a perspective view of an infeed belt assembly and infeed assembly.

Referring to FIGS. 12 and 13 a perspective view of an alternative embodiment liver and heart stripper assembly is shown. Again shown is the overhead indexer conveyor assembly 110, including the indexer support bracket 402, indexing belt 302 and indexers. The slide assembly 108 is also shown including left and right slide bars 508 and 506. The cutter 208 and the blade 532 is also shown. A more complete view of the strip down belt 802 including the strip down indexers 804 is shown. The difference in this embodiment is where the infeed assembly 104 feeds the inward feeding belt assembly 1200. The infeed belt assembly 1200 includes proximately spaced apart left and right inward feeding belts 1204 and 1202. The left and right inward feeding belts are configured such that each endless belt travels over three rollers 1304, 1308 and a third roller not shown in this view for the left belt and 1306, 1310 and a third belt not shown for the right belt thereby creating a triangular path of travel. The belts convey inwardly and opposite with respect to one another. The upper portion of the inside run 1208 and 1206 of each belt is directed inward one toward the other forming a v-shaped channel for urging a viscera pack downward similar to the rollers described in the previous embodiment. Rollers 1308 and 1310 are similar to the pinch roller embodiment but in this embodiment a belt travels over the rollers to converge along a nip line 1302 formed by rollers 1308 and 1310 and the belt traveling over said rollers. The inside or inward runs 1206 and 1208 slope inward with respect to each other to converge along a nip line. Below the nip line the belts diverge outward with respect to each other such that viscera portions pulled below the nip line is not continuously pulled downward by the belts.

Once removed, the viscera pack can be allowed to fall into the infeed assembly 104 having an infeed chute for channeling the viscera pack into the harvester system for further processing. The infeed assembly 104 can channel the viscera pack to engage the inward infeed belt assembly 1200. The viscera pack is channeled to engage a pair of inward feeding belts conveying inward toward themselves in motion and spaced apart such that the viscera pack is forced into the inward feeding belts with only the gizzard portion of the viscera pack remaining on top of the top portion of the v-shaped inside run of the inward infeed belts. The inward infeed belts can be sufficiently aggressive to pull all of the viscera pack there through with the exception of the gizzard portion. An overhead indexer conveyor assembly 110 can engage the viscera pack by engaging and pushing the gizzard portion along the length of the rollers to thereby exit the roller assembly 106 to engage a slide assembly 108.

The various liver and heart harvesting apparatus examples shown above illustrate a novel method for harvesting livers and hearts with increased quality and yield. A user of the present invention may choose any of the above harvester embodiments, or an equivalent thereof, depending upon the desired application. In this regard, it is recognized that various forms of the subject harvester invention could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the sprit and scope of the present invention.

Other aspects, objects and advantages of the present invention can be obtained from a study of the drawings, the disclosure and the appended claims.

What is claimed is:

1. An apparatus for harvesting usable parts from a poultry viscera comprising:
   a slide assembly having side by side left and right slide rails extending horizontally from an up stream end to a down stream end along a path of conveyance, where said left and right slide rails extend substantially in parallel, are substantially stationary and are proximately spaced apart forming a lengthwise substantially uniform slide gap there between, and where said slide gap is sufficiently narrow to prevent an upper portion of a viscera to pass there through while sufficiently wide to allow a connective tissue of the viscera to pass through said gap whereby a lower portion of the viscera is maintained below the slide assembly and the upper portion of the viscera is supported below by the slide assembly;
   a pull down stripper assembly vertically aligned below the upstream end of the slide assembly and operable to urge the lower portion of the viscera downward to loosen and extend the viscera, where said pull down stripper assembly having a leading pull down member oriented to engage the lower portion of the viscera and urge the lower portion of the viscera downward as the viscera is being conveyed along the path of conveyance and where said pull down stripper further comprises a motorized pull down belt having flaps extending there from and operable to urge downward on the lower portion of the viscera; and
   a strip down arm assembly vertically aligned below the downstream end of the slide assembly having a strip down plate having side by side left and right strip down plates extending with a downward slope with respect to the slide assembly from an up stream end to a down stream end along a path of conveyance, where said left and right strip down plates extend in parallel and are proximately spaced apart forming a lengthwise substantially uniform stripping gap there between, and where said stripping gap is sufficiently narrow to prevent a liver and heart portion of a viscera to pass there through while sufficiently wide to allow the connective tissue of the viscera to pass through said stripping gap whereby the heart and liver portion of the viscera is maintained below the strip down arm assembly and pulled away from the upper portion of the viscera.

2. The apparatus as recited in claim 1, further comprising:
   an overhead indexer conveyor assembly vertically aligned above the slide assembly having an indexing belt with indexer members extending from said belt and oriented to urge the upper portion of the viscera along the slide assembly.

3. The apparatus as recited in claim 2, further comprising:
   a pull down cutter positioned at the down stream end of the pull down stripper assembly for cutting away unwanted excess lower most viscera.

4. The apparatus as recited in claim 2, further comprising:
   a strip down cutter positioned at the down stream end of the strip down arm assembly for cutting away the heart and liver of the viscera.

5. The apparatus as recited in claim 2, further comprising:
   spaced apart counter rollers each having an endless belt traveling there over whereby the endless belts are operable to convey inward and counter one toward the other and said belts are sloped inward one with respect to the other converging at a nip line between the rollers, said spaced apart rollers and endless belts positioned just prior the upstream end of the slide rail assembly and sufficiently aggressive to pull through said spaced apart rollers substantially all but the upper portion of the viscera and where said overhead indexer conveyor is oriented to urge the upper portion of the viscera along the counter rollers to the slide assembly.

6. The apparatus as recited in claim 2, further comprising:
pinch counter rollers position just prior the upstream end of the slide rail assembly and sufficiently aggressive to pull through said pinch roller substantially all but the upper portion of the viscera and where said overhead indexer conveyor is oriented to urge the upper portion of the viscera along the pinch rollers to the slide assembly.

7. The apparatus as recited in claim 6, further comprising:
an infeed assembly having a chute for channeling the viscera to engage the pinch rollers.

8. The apparatus as recited in claim 2, further comprising:
a motorized strip down belt having strip down indexer flaps extending therefrom where said strip down belt is vertically aligned below the strip down aim whereby the strip down indexer flaps urge the heart and liver to pull away from the viscera.

9. An apparatus for harvesting usable parts from a poultry viscera comprising:
a substantially stationary slide rail assembly means having an end to end lengthwise gap extending from an up stream end to a down stream end along a path of conveyance for preventing an upper portion of a viscera to pass there through while allowing a connective tissue of the viscera to pass through said gap whereby a lower portion of the viscera is maintained below the slide assembly, and whereby the slide rail assembly supports the upper portion of viscera from below;
a pull down stripper assembly means vertically aligned below the upstream end of the slide rail assembly means, said pull down stripper means for urging the lower portion of the viscera downward to loosen and extend the viscera and for urging the lower portion of the viscera downward as the viscera is being conveyed along a path of conveyance; and
a strip down arm assembly means vertically aligned below the downstream end of the slide assembly having a downward slope with respect to the slide assembly from an up stream end to a down stream end along a path of conveyance, and having an end to end lengthwise substantially uniform stripping gap for preventing a liver and heart portion of a viscera to pass there through said stripping gap while allowing a connective tissue of the viscera to pass through said stripping gap whereby the heart and liver portion of the viscera is maintained below the strip down arm assembly means and pulled away from the upper portion of the viscera.

10. The apparatus as recited in claim 9, further comprising:
an overhead indexer conveyor means for engaging and urging the upper portion of the viscera along the slide assembly.

11. The apparatus as recited in claim 10, further comprising:
a pull down cutter means for cutting away excess at the down stream end of the pull down stripper assembly means.

12. The apparatus as recited in claim 10, further comprising:
a strip down cutter means for cutting away the heart and liver at the down stream end of the strip down arm means.

13. The apparatus as recited in claim 10, further comprising:
spaced apart counter rollers each having an endless belt means for conveying inward and counter one toward the other and for sloping inward one with respect to the other converging at a nip line between the rollers, and for pulling through said pinch roller substantially all but the upper portion of the viscera and where said overhead indexer conveyor is oriented to urge the upper portion of the viscera along the counter rollers to the slide assembly.

14. The apparatus as recited in claim 10, further comprising:
a pinch roller means for pulling all but the upper portion of the viscera there through.

15. The apparatus as recited in claim 14, further comprising:
an infeed assembly means for channeling the viscera to engage the pinch rollers.

16. The apparatus as recited in claim 10, further comprising:
a strip down belt means having indexer flap means for urging the heart and liver to pull away from the viscera.

17. An apparatus for harvesting usable parts from a poultry viscera comprising:
a slide assembly having side by side left and right slide rails extending horizontally from an up stream end to a down stream end along a path of conveyance, where said left and right slide rails extend substantially in parallel, are substantially stationary and are proximately spaced apart forming a lengthwise substantially uniform slide gap there between, and where said slide gap is sufficiently narrow to prevent an upper portion of a viscera to pass there through while sufficiently wide to allow a connective tissue of the viscera to pass through said gap whereby a lower portion of the viscera is maintained below the slide assembly and whereby the upper portion of the viscera is supported below by the slide assembly;
a pull down stripper assembly vertically aligned below the upstream end of the slide assembly and operable to urge the lower portion of the viscera downward to loosen and extend the viscera, where said pull down stripper comprises a motorized endless pull down belt with runs and pull down rollers, where the runs of the belt between the pull down rollers of the pull down belt are substantially vertical and said pull down belt having flaps extending there from operable to urge downward on the lower portion of the viscera; and
a strip down arm assembly vertically aligned below the downstream end of the slide assembly having a strip down plate having side by side left and right strip down plates extending with a downward slope with respect to the slide assembly from an up stream end to a down stream end along a path of conveyance, where said left and right strip down plates extend in parallel and are proximately spaced apart forming a lengthwise substantially uniform stripping gap there between, and where said stripping gap is sufficiently narrow to prevent a liver and heart portion of a viscera to pass there through while sufficiently wide to allow the connective tissue of the viscera to pass through said stripping gap whereby the heart and liver portion of the viscera is maintained below the strip down arm assembly and pulled away from the upper portion of the viscera.

18. The apparatus as recited in claim 17, further comprising:
an infeed belt assembly having proximately space apart left and right inward feeding belts respectively having left and right inward runs facing inwardly one with respect to the other and said left and right inward runs each having an inward slope where the runs converged at a nip line, where said left and right inward feeding belts is sufficiently aggressive to pull through said nip line substantially all but the upper portion of the viscera.

19. The apparatus as recited in claim 17, further comprising:
an overhead indexer conveyor assembly vertically aligned above the slide assembly having an indexing belt with indexer members extending from said belt and oriented to urge the upper portion of the viscera along the slide assembly.

20. The apparatus as recited in claim 17, further comprising:
a pull down cutter positioned at the down stream end of the pull down stripper assembly for cutting away unwanted excess lower most viscera.

21. The apparatus as recited in claim 17, further comprising:
a strip down cutter positioned at the down stream end of the strip down arm assembly for cutting away the heart and liver of the viscera.

\* \* \* \* \*